United States Patent
Gelmini et al.

(10) Patent No.: US 12,031,591 B2
(45) Date of Patent: Jul. 9, 2024

(54) TRANSMISSION HYDRAULIC SYSTEM AND METHOD FOR OPERATION OF THE HYDRAULIC SYSTEM

(71) Applicant: DANA ITALIA S.R.L., Arco (IT)

(72) Inventors: Mario Gelmini, Arco (IT); Giovanni Profumo, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/155,602

(22) Filed: Jan. 17, 2023

(65) Prior Publication Data

US 2023/0151854 A1 May 18, 2023

Related U.S. Application Data

(63) Continuation of application No. 17/445,814, filed on Aug. 24, 2021, now Pat. No. 11,585,393.

(51) Int. Cl.
| | |
|---|---|
| *F16D 13/74* | (2006.01) |
| *F16D 25/12* | (2006.01) |
| *F16D 48/02* | (2006.01) |
| *F16D 13/52* | (2006.01) |

(52) U.S. Cl.
CPC .......... *F16D 25/123* (2013.01); *F16D 13/74* (2013.01); *F16D 25/14* (2013.01); *F16D 13/52* (2013.01); *F16D 2300/06* (2013.01)

(58) Field of Classification Search
CPC .......... F16D 13/72; F16D 13/74; F16D 25/14; F16D 13/52
See application file for complete search history.

(56) References Cited

U.S. PATENT DOCUMENTS

| | | | |
|---|---|---|---|
| 3,351,169 A | 11/1967 | McIndoe | |
| 4,157,750 A | 6/1979 | Horsch | |
| 5,230,664 A | 7/1993 | Michioka et al. | |
| 5,337,871 A | 8/1994 | Testerman | |
| 5,613,588 A | 3/1997 | Vu | |
| 6,840,363 B2 | 1/2005 | Braford, Jr. et al. | |
| 10,837,501 B2 * | 11/2020 | Kim | F16D 48/062 |
| 11,578,767 B2 * | 2/2023 | Nishiyabu | F16D 25/0638 |
| 2004/0154894 A1 * | 8/2004 | Braford, Jr. | F16D 25/0638 192/106 F |

(Continued)

FOREIGN PATENT DOCUMENTS

| | | |
|---|---|---|
| DE | 4136583 A1 | 5/1993 |
| DE | 102010039171 A1 | 2/2012 |

(Continued)

*Primary Examiner* — Stacey A Fluhart
(74) *Attorney, Agent, or Firm* — McCoy Russell LLP

(57) ABSTRACT

Methods and systems for a transmission are provided herein. In one example, a hydraulic system includes a lubrication valve included in a lubricant line and designed to adjust a flow of lubricant to a multi-disc wet clutch. The hydraulic system further includes a clutch line coupled to a clutch control valve, where the clutch line is in fluidic communication with a hydraulic fluid to a clutch actuator of the multi-disc wet clutch and a passive adjustment device of the lubrication valve and where the passive adjustment device transitions the lubrication valve between a limited flow state and an open flow state based on a pressure of the hydraulic fluid in the clutch line.

20 Claims, 6 Drawing Sheets

(56) References Cited

U.S. PATENT DOCUMENTS

| | | | | |
|---|---|---|---|---|
| 2008/0277232 A1* | 11/2008 | Miyazaki | ............ | F16D 25/123 |
| | | | | 192/70.12 |
| 2011/0042177 A1* | 2/2011 | Bauer | ................ | F16D 48/0206 |
| | | | | 192/85.61 |
| 2015/0006050 A1* | 1/2015 | Egashira | ................ | F16D 48/02 |
| | | | | 701/68 |
| 2015/0012191 A1 | 1/2015 | Ohya et al. | | |
| 2015/0308523 A1* | 10/2015 | Thornton | ............ | F16D 25/0638 |
| | | | | 701/68 |
| 2017/0089402 A1* | 3/2017 | Deakin | ................ | F16D 25/123 |
| 2018/0266497 A1* | 9/2018 | Herman | ............ | F16H 57/0473 |

FOREIGN PATENT DOCUMENTS

| | | | | |
|---|---|---|---|---|
| DE | 102016202656 A1 | 9/2016 | | |
| EP | 3217041 A1 * | 9/2017 | ............ | F16D 13/74 |

\* cited by examiner

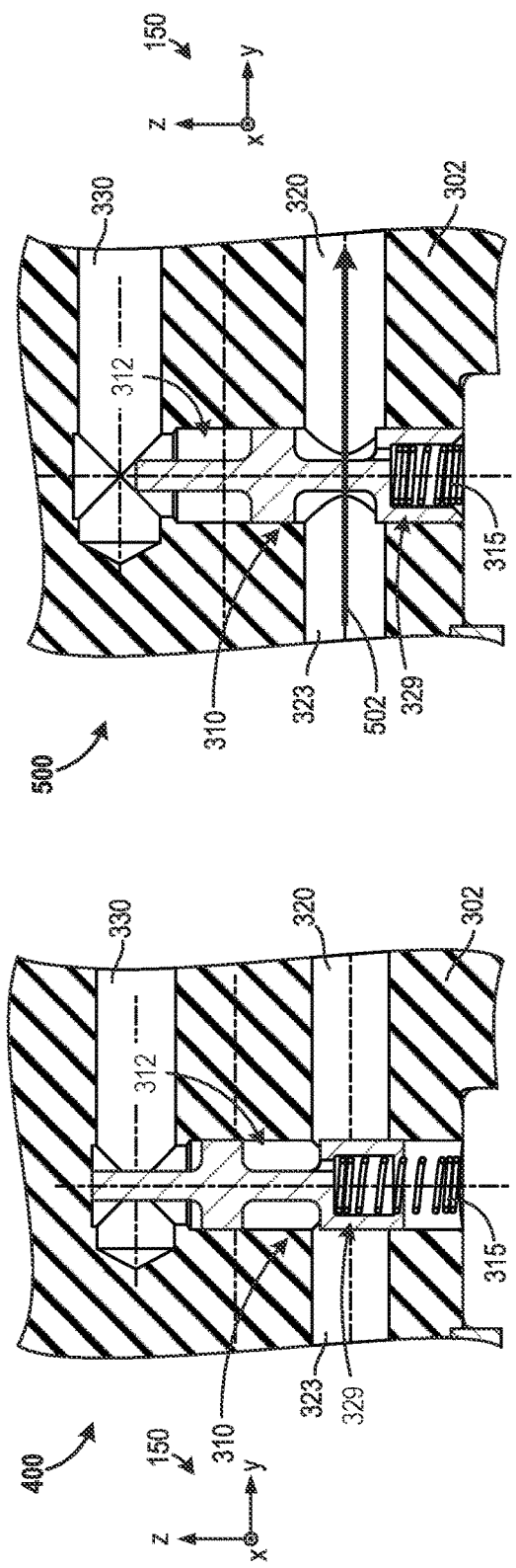
FIG. 4
FIG. 5
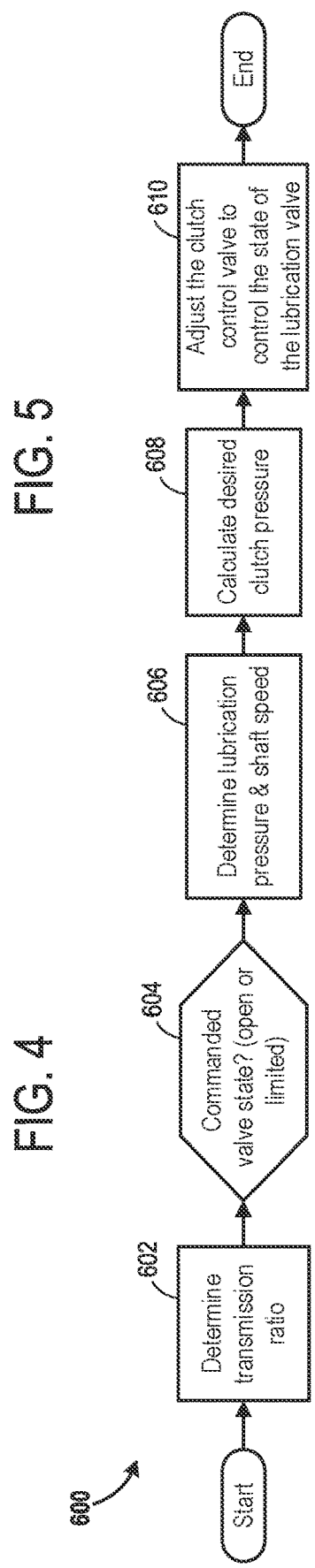
FIG. 6

TRANSMISSION HYDRAULIC SYSTEM AND METHOD FOR OPERATION OF THE HYDRAULIC SYSTEM

CROSS REFERENCE TO RELATED APPLICATION

The present application is a continuation of U.S. Non-Provisional patent application Ser. No. 17/445,814, entitled "TRANSMISSION HYDRAULIC SYSTEM AND METHOD FOR OPERATION OF THE HYDRAULIC SYSTEM", and filed on Aug. 24, 2021. The entire contents of the above-listed application are hereby incorporated by reference for all purposes.

TECHNICAL FIELD

The present description relates generally to a hydraulic system in a transmission providing both clutch actuation and lubrication functionality.

BACKGROUND AND SUMMARY

Certain transmissions use hydraulically controlled components, such as wet friction clutches, to reduce power interruptions during shifting transients to diminish noise, vibration, and harshness (NVH). Transmission have additionally deployed lubrication systems that direct oil to bearings, clutches, such as friction clutches, and other moving components, to increase component longevity and reduce wear. The lubricant supplied to the friction clutches decreases clutch wear but may also increase drag torque due to the viscous effects of oil that occur when the clutch is disengaged. This drag torque may cause continuous undesired power losses which decreases gearbox efficiency. US 2015/0012191 A1 to Ohya et al. teaches an automatic transmission with a lubricating oil supply system that routes oil to a plurality of clutches and a motor for lubrication and cooling. In the oil supply system, an electronically adjusted flowrate control valve is positioned downstream of a relief valve. Further, in the system, the flowrate control valve is actively commanded by a controller to decrease the pressure of oil delivered to the clutches, particularly during disengagement.

The inventors have recognized several issues with Ohya's oil supply system and other hydraulic systems. Using a hydraulic clutch actuation system that is independent from a clutch lubrication system may demand complex hydraulic conduit routing schemes. The complex hydraulic conduit routing schemes may pose barriers to space efficient integration of both systems into a tightly packaged transmission. Further, higher amounts of computational resources may be devoted to actively controlling the flowrate valve downstream of the relief valve for relief flow adjustment, when compared to system which may use coordinated hydraulic and lubrication system control. Because of the added structural and computational complexity, previous hydraulic systems have been costly and exhibited packaging inefficiencies. Further, Ohya's oil supply strategy for the clutch may, under some circumstances, fall short of meeting the clutch's lubrication demands, particularly during shifting transients.

To resolve at least a portion of the aforementioned issues, the inventors have developed a hydraulic system in a transmission including a lubrication valve positioned in a lubrication line. The hydraulic system further includes a clutch line in fluidic communication with a multi-disc wet clutch and a passive adjustment device of the lubrication valve. The hydraulic system also includes a clutch control valve designed to adjust the hydraulic pressure in the clutch line. In the system, the passive adjustment device transitions the lubrication valve between a limited flow state and an open flow state based on a pressure of the hydraulic fluid in the clutch line. In this way, the hydraulic system may effectively adjust the lubricant flow to the clutch using a system that may be more space efficient and less costly and complex than systems with lubrication valves that are directly electronically actuated.

As one example, the hydraulic system may further include a controller that is designed to determine a desired lubrication valve state based on a transmission gear ratio. The controller is further designed to adjust the pressure in the clutch line by actuation of the clutch control valve to place the lubrication in the limited flow state or the open flow state based on a transmission shift event. For example, the controller may maintain the clutch line pressure above a threshold value when the clutch is engaged and the transmission remains in a desired gear. However, after the transmission is shifted out of the gear, the clutch remains disengaged, and the transmission ratio deviates from the shift point ratio by a predetermined value, the clutch line pressure may be decreased below the threshold value. In this manner, the system delivers a higher lubricant flow to the clutch while the clutch is engaged, for instance, to enhance clutch performance and decrease clutch degradation and deliver a lower lubricant flow to the clutch during disengagement, to decrease drag torque losses and consequently increase transmission efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows the lubrication valve, depicted in FIG. 3, in an open flow state.

FIG. 5 shows the lubrication valve, depicted in FIG. 3, in a limited flow state.

FIG. 6 shows a method for operating a hydraulic system to adjust a state of a lubrication valve.

DETAILED DESCRIPTION

The following description relates to a hydraulic system in a transmission and a control technique for adjusting a lubrication valve state using hydraulic clutch pressure, as determined by a clutch control valve. The hydraulic system includes a pressure controlled lubrication valve that alters a flow of lubricant supplied to the clutch. In the hydraulic system, a clutch line delivers a hydraulic fluid to a multi-disc wet clutch. A branch of the clutch line is routed to the pressure controlled lubrication valve to permit the clutch line pressure to induce opening and closing of the lubrication valve. The lubrication valve may therefore be switched between a limited flow state and an open flow state using clutch line pressure control that is adjusted through operation of the clutch control valve. The clutch line pressure may, for example, be kept above a threshold pressure that maintains the lubrication valve in a high flow state while the clutch is engaged. Conversely, the clutch line pressure may be decreased below the threshold pressure to switch the lubrication valve to a limited flow state (e.g., choked flow state) when the clutch is disengaged. In one specific example, when the transmission's operating gear ratio is far enough from the gear shift point (corresponding to clutch disengagement), the lubricant valve may be switched to the limited flow state using pressure control. In this way, the lubrication valve is passively and efficiently operated to provide a higher flow of the hydraulic fluid when clutch lubrication demands are higher and then decrease lubricant flow to the clutch when higher lubricant flow is not demanded. Drag torque from the clutch is decreased, as a result, and the transmission efficiency may be correspondingly increased. Further, in some cases, to increase system compactness and efficiently route lubricant to the clutch, the lubrication valve, the lubrication line, and the clutch line may be included within a rotating shaft of the transmission.

Figure 1:
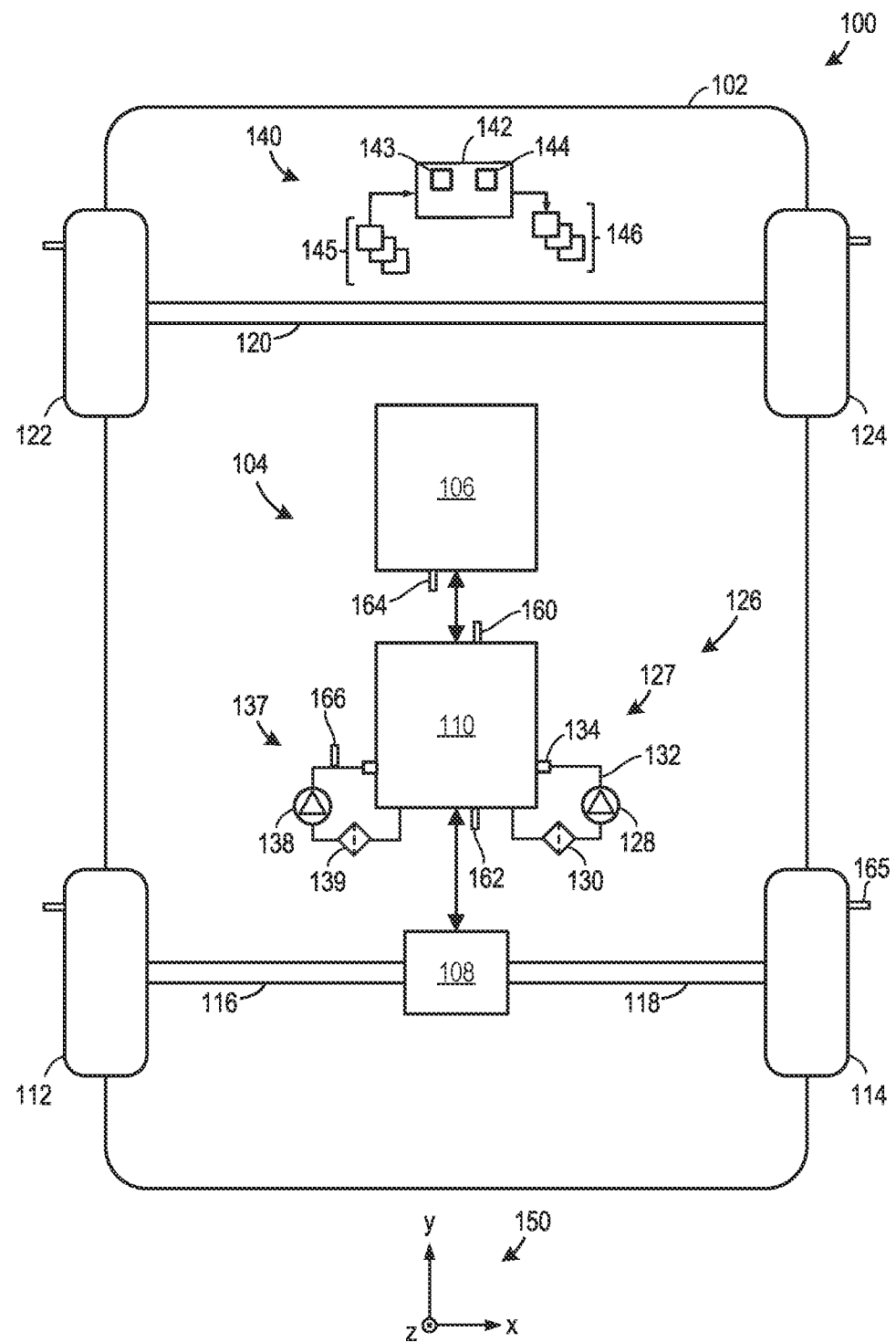
FIG. 1 is a schematic representation of a vehicle transmission with a hydraulic system.
Figure 2:
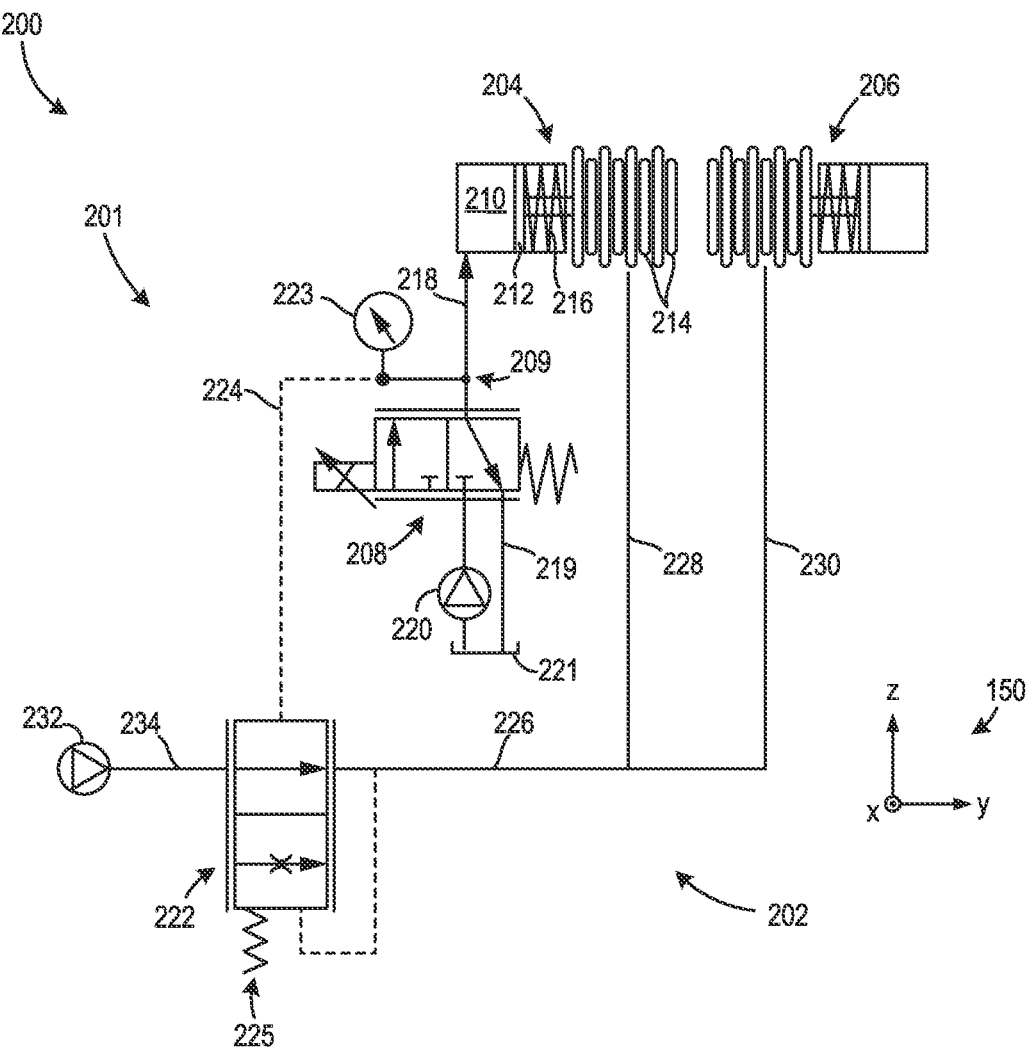
FIG. 2 depicts a first example of a hydraulic system with a lubrication valve and a hydraulic clutch.
Figure 3:
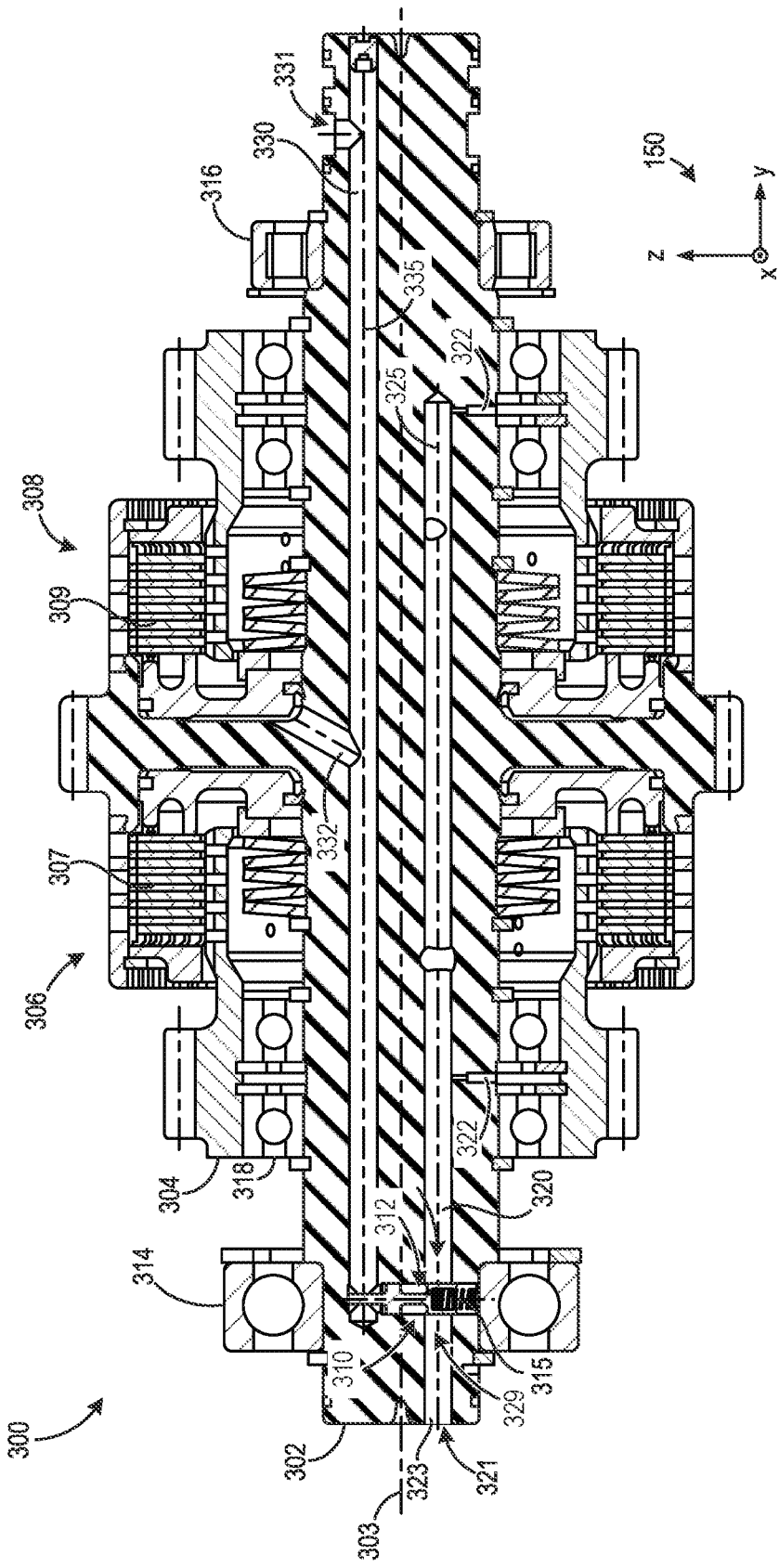
FIG. 3 shows a second example of a hydraulic system with a lubrication valve and a hydraulic clutch.
Figures 7A, 7B:
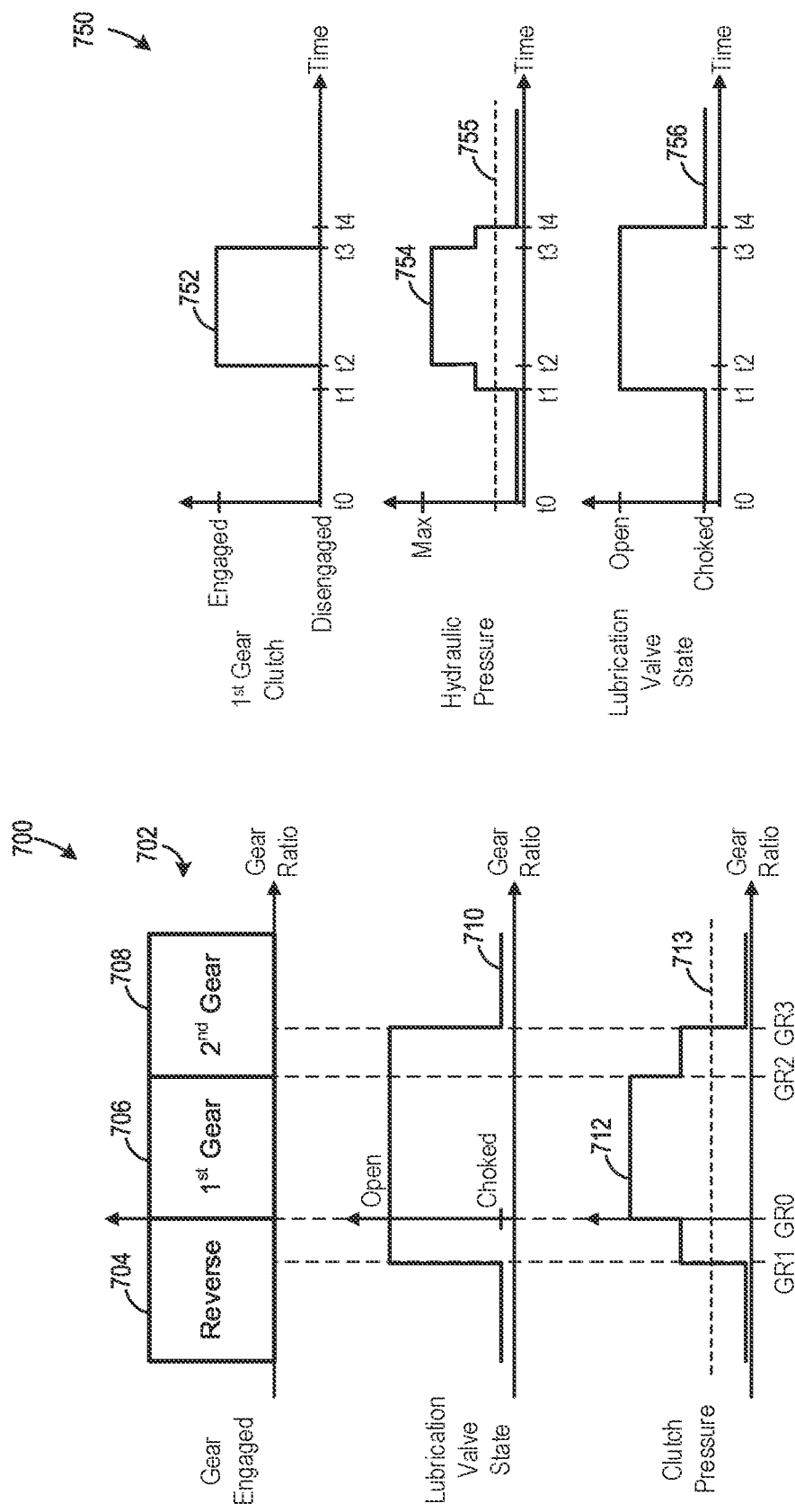
FIG. 7A shows an example control strategy for adjusting a lubrication valve.
FIG. 7B shows a timing diagram depicting a lubrication valve control strategy.
Figure 8:
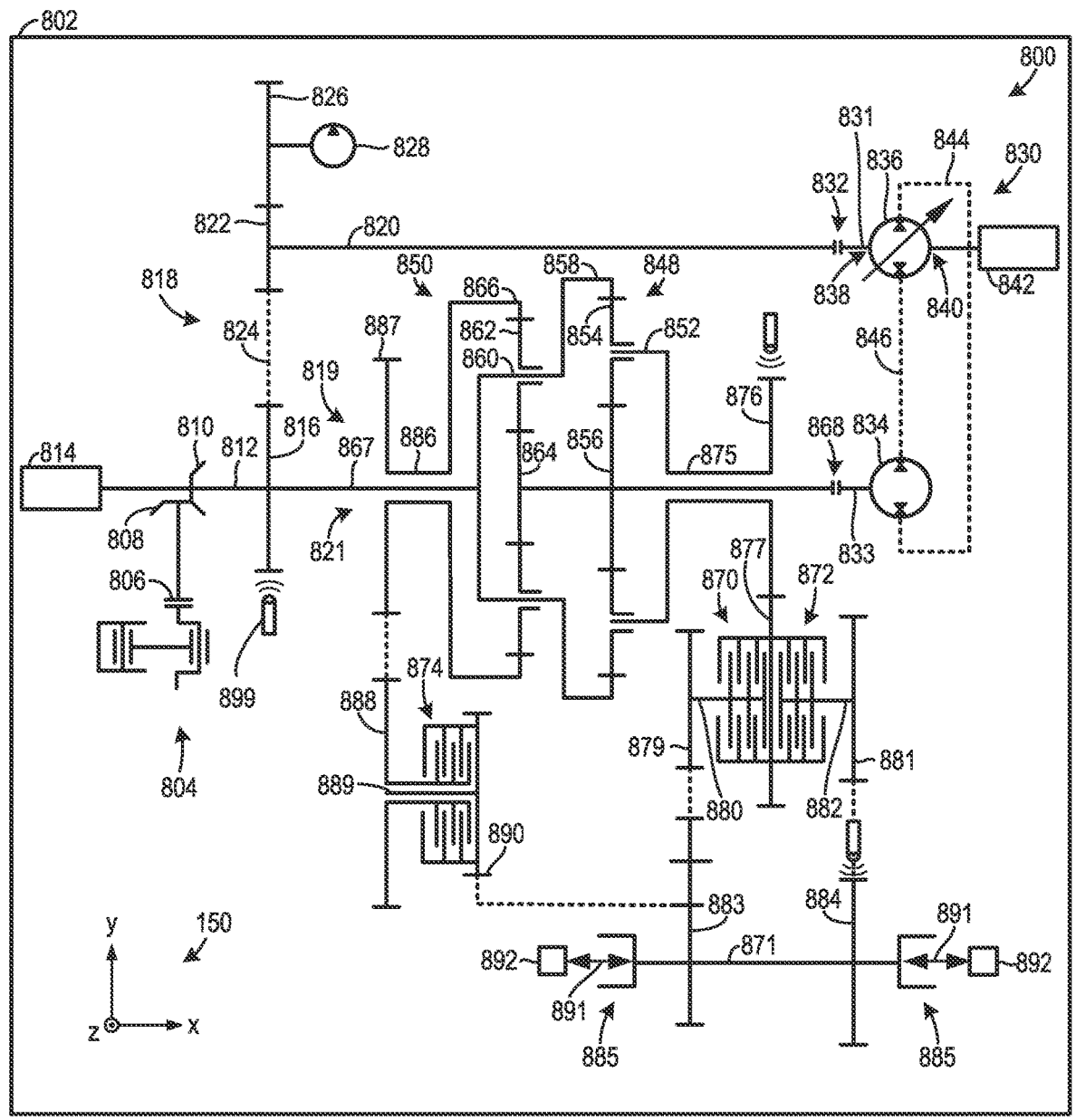
FIG. 8 shows a schematic representation of a vehicle with a hydromechanical transmission.

FIG. 1 schematically illustrates a hydraulic system in a vehicle transmission. FIG. 2 shows an example hydraulic system having a clutch control valve for actuating a first hydraulic clutch and adjusting a position of a lubrication valve, where the lubrication valve controls a supply of hydraulic fluid to the first hydraulic clutch and a second hydraulic clutch. FIG. 3 depicts an example of a rotating shaft in a transmission having the lubrication valve positioned therein. FIGS. 4 and 5 show the lubrication valve of FIG. 3 in a limited flow state and an open flow state, respectively, as determined by a hydraulic pressure in a clutch line. FIG. 6 shows an example control routine for operating a hydraulic system based on a gear ratio to adjust a lubrication valve state. FIGS. 7A-7B show control and timing diagrams for a hydraulic system. FIG. 8 schematically depicts a hydromechanical transmission which may include a hydraulic system according to the examples described herein.

FIG. 1 schematically illustrates a vehicle system 100 including a vehicle 102 having a powertrain 104. The vehicle may take a variety of forms in different embodiments such as a light, medium, or heavy duty vehicle. To generate power, the powertrain 104 may include a motive power source 106. The power source may include an electric motor (e.g., electric motor-generator), an internal combustion engine (ICE) (e.g., a spark and/or compression ignition engine), combinations thereof, or other suitable devices designed to generate rotational energy. The internal combustion engine may include conventional components such as cylinder(s), piston(s), valves, a fuel delivery system, an intake system, an exhaust system, etc. Further, the electric motor may include conventional components such as a rotor, a stator, a housing, and the like for generating mechanical power as well as electrical power during a regeneration mode, in some cases. As such, the powertrain may be utilized in a hybrid or battery electric vehicle. In other examples, however, the vehicle may solely use an internal combustion engine for motive power generation.

The motive power source 106 may provide mechanical power to a differential 108 via a transmission 110. The power path may continue through the differential 108 to drive wheels 112, 114 by way of axle shafts 116, 118, respectively. As such, the differential 108 distributes rotational driving force, received from transmission 110, to the drive wheels 112, 114 of axle shafts 116, 118, respectively during certain operating conditions. In some examples, the vehicle 102 may further include a second axle 120 that is coupled to an ICE for providing power to wheels 122, 124.

The transmission 110 may be a hydromechanical variable transmission (HVT). Further, the transmission 110 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios. Alternatively, the transmission 110 may be another type of continuously variable transmission (CVT) capable of seamlessly shifting through a continuous range of gear ratios, such as, for instance, a hydrostatic CVT using a variable displacement pump and a hydraulic motor to convert hydraulic pressure to rotation of an input shaft. In still other examples, the transmission may be a dual-clutch automatic transmission (DCT), employing two input clutches which connect a pair of input shafts to a motive power source. The DCT may be able to efficiently switch between gears by timing the operation of one clutch to engage as the other is disengaging so that there is little or substantially no interruption of torque supply to the wheels during shifting, where the capability for smooth transitions between gear ratios may enhance vehicle drivability and shift quality. Further, the differential 108 may be a locking differential, an electronically controlled limited slip differential, or a torque vectoring differential, in some examples.

The transmission 110 may further include a hydraulic system 126 designed to provide hydraulic fluid (e.g., natural and/or synthetic oil) to various components and assemblies of the transmission. Specifically, in one example, the hydraulic system 126 may be designed to deliver oil to a multi-disc wet clutch for actuation and/or lubrication thereof via a control valve, which will be discussed in further detail with regard to FIGS. 2-7B. In some examples, the hydraulic system may be configured to supply hydraulic fluid to multiple clutches, each in fluidic communication with a respective control valve.

The hydraulic system 126 may include an actuation circuit 127 for hydraulically actuating clutches within the transmission 110 and a lubrication circuit 137 for delivering lubricant to transmission components such as the clutches, bearings, and the like. The actuation circuit 127 may include a pump 128, with a filter 130, for driving hydraulic fluid flow through a fluid delivery line 132 to an inlet 134. The lubrication circuit 137 may include a pump 138 for driving lubricant flow through the circuit with a filter 139 arranged upstream thereof. In some examples, the pumps 128, 138 may be provided at an exterior of the transmission. However, in other examples, the pumps may be included within the transmission. In some examples, the pump 128 and/or the pump 138 may receive hydraulic fluid from a common reservoir, such as, for instance, receiving a common hydraulic fluid from a sump within the transmission 110. However, in other examples, the pumps 128, 138 may be in fluidic communication with different reservoirs or sources of hydraulic fluid (e.g., oil). Further, in some cases, the hydraulic system 126 may be designed to deliver hydraulic fluid, via the pump 128 and/or 138, to other hydraulic devices and other components of the transmission 110.

The vehicle 102 may further include a control system 140 with a controller 142. The controller may include a processor 143 and a memory 144 with instructions stored therein that, when executed by the processor, cause the controller to perform various methods, control techniques, etc. described herein. The processor may include a microprocessor unit and/or other types of circuits. The memory may include known data storage mediums such as random access memory, read only memory, keep alive memory, combinations thereof, etc.

The controller 142 may receive various signals from sensors 145 positioned in the vehicle 102 and the transmission 110. The sensors may include a transmission input and output speed sensor 160, 162, an engine or motor speed sensor 164, wheel speed sensors 165, an oil temperature sensor 166, oil pressure sensors, clutch position sensors, etc. Conversely, the controller may send control signals to various actuators 146 at different locations in the vehicle and transmission based on received signals and instructions stored in the memory 144 of the controller 142. For instance, the controller may send a command signal to a clutch control valve in the transmission 110 and responsive to receiving the command signal, an actuator in the control valve may adjust the valve to induce clutch engagement or disengagement. Further, a controller similar to the controller 142, illustrated in FIG. 1, may be used to adjust the controllable components shown in FIGS. 2-3, such as the clutch control valves.

An axis system 150 is provided in FIG. 1, as well as FIGS. 2-5 and 8, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 depicts an example hydraulic system 200 including hydraulic circuits 201 and 202. The hydraulic system 200 may be included in a transmission of a vehicle, such as transmission 110 of vehicle 102 depicted in FIG. 1, and may thus share similarities with hydraulic system 126. The hydraulic circuit 201 may be designed for routing a hydraulic fluid (e.g., oil) to control various hydraulic components in a transmission, such as, for instance, hydraulically-actuated clutches, hydrostatic pumps, hydraulic motors, etc. The hydraulic circuit 202 may also be designed to route a hydraulic fluid (e.g., oil), which may the same hydraulic fluid in hydraulic circuit 201, for lubricating various components in the transmission, such as clutches, bearings, etc., as will be described herein. Alternatively, distinct hydraulic fluids may be used in the circuits 201 and 202, in other examples.

In the illustrated example, the hydraulic circuit 201 may include a control valve 208 operable to control a flow of hydraulic fluid delivered to a clutch 204, and the hydraulic circuit 202 may include a lubrication valve 222 for allowing or restricting a flow of hydraulic fluid to the clutch 204 as well as a clutch 206. Further, while the control valve 208 may be electronically controlled to supply a hydraulic pressure in the hydraulic circuit 201, the lubrication valve 222 may, in some examples, not be directly electronically controlled. Rather, the lubrication valve 222 may be controlled to an open or limited flow (e.g., choked flow) state, to allow or restrict a flow of lubricant in the hydraulic circuit 202, respectively, due to a pressure of the hydraulic fluid within hydraulic circuit 201, as determined by the control valve 208. To elaborate, the lubrication valve 222 may include a passive adjustment device 225 which reacts to a hydraulic pressure provided through clutch control valve 208 within hydraulic circuit 201. In some examples, the passive adjustment device 225 may include a spool valve that resides within a chamber in fluidic communication with each of the hydraulic circuits 201, 202, so as to selectively allow flow through the hydraulic circuit 202 based on a position of the device 225 determined by a pressure within hydraulic circuit 201. In this way, the passively controlled lubrication valve may effectively and efficiently lubricate hydraulic components during certain operating conditions, as dictated by the control valve, in a simple manner which reduces system complexity. To expound, the system may avoid the use of an additional control valve for adjusting the lubrication valve, if wanted, which enables the system to achieve a passively adjusted and cost-effective lubrication valve arrangement.

The hydraulic clutches 204, 206 are specifically illustrated as multi-disc wet clutches. The clutches 204, 206 may be similar in structure and function, and may each be in fluidic communication with a separate control valve so as to receive hydraulic fluid therefrom. As previously introduced, the hydraulic circuit 201 may include the first clutch control valve 208 in fluidic communication with the clutch 204, while a second clutch control valve in fluidic communication with the clutch 206 may be included in a separate hydraulic circuit. Further, in one example, the hydraulic clutch 204 may be associated with a first forward drive gear, and the hydraulic clutch 206 may be associated with a second forward drive gear or, in some cases, a first reverse drive gear. Thus, the control valve 208 may be operated to shift the first clutch 204 into an engaged state which places the transmission in a selected gear (e.g., a first forward drive gear, a second forward drive gear, or a reverse gear).

The multi-disc wet clutch 204 may include an actuator with a hydraulic chamber 210 and a piston 212 that is axially slidable in the chamber. The clutch may further include a clutch pack having interleaved separator and friction discs 214 that are designed to selectively engage one another, and the piston may be biased (e.g., by a spring 216) into a disengagement position (away from the clutch pack) where the plates are disengaged. Pressurized hydraulic fluid is supplied to the hydraulic chamber 210 via a clutch line 218 (fluidly connected to a port of the actuation cylinder), such that hydraulic pressure in the chamber causes the piston 212 to move into an engagement position (towards the clutch pack) to urge the separator and friction plates to engage to allow torque transmission through the clutch. It will be understood that clutch 206, being substantially identical to clutch 204, may include similar components and operate in a similar manner. In other examples, however, other types of hydraulically operated clutches may be used, such as hydraulically operated dog clutches.

The control valve 208 may be an electronically actuated valve designed to control the pressure and/or flow of hydraulic fluid in the clutch line 218 that extends between the multi-disc wet clutch 204 and the valve. The hydraulic system 200 further includes a pump 220 that supplies hydraulic fluid to the control valve 208. The pump 220 may be a fixed displacement pump, such as a positive displacement hydraulic pump having a housing and a pumping element (e.g., a reciprocating piston or rotary element) designed to deliver a pressurized hydraulic fluid during each cycle, in some examples. The control valve 208 adjusts the pressure of the hydraulic fluid in the line 218 to engage and disengage the multi-disc wet clutch 204. For instance, the control valve may increase the pressure in the line 218 to induce clutch engagement during a gear shift event. Conversely, the control valve may decrease the pressure in the line to disengage the clutch when the transmission is shifted into another gear. In some cases, the pump 220 may receive the hydraulic fluid from a reservoir 221 (e.g., via a fluid pick-up line), and the control valve 208 may return hydraulic fluid to the reservoir 221 via a fluid return line 219.

In one example, the actuation of the clutch 204 may include a prefilling phase where the control valve 208 delivers a prefill pressure to the hydraulic piston 212. In the prefill phase of the clutch, the piston is readied for clutch engagement by providing the piston cylinder with a hydraulic pressure that is lower than a spring preload pressure, such that the piston is pressurized but remains at a rest position. The prefilling step enables (e.g., ensures that) the clutch line to be filled with oil (e.g., without entrainment of air bubbles therein) to facilitate reliable and repeatable behavior with regard to both the clutch line and the control valve in preparation for clutch engagement. Subsequent to the prefill phase, when clutch engagement is anticipated, the clutch may enter a filling phase in which the hydraulic pressure supplied to the piston may be further increased to induce clutch engagement. The increased hydraulic pressure moves the piston from the prefill position (e.g., rest position) to or near a kiss point position (i.e., the point at which the clutch begins to transmit torque). The filling phase may be performed at discrete times in anticipation of a shift event, and may decrease shift delays. After the clutch reaches the kiss point, when clutch engagement is demanded, the clutch enters an engagement phase where additional hydraulic pressure applied to the piston induces engagement of the clutch plates. In some cases, controller logic may trigger the transition from the prefill phase to the filling phase and from the filling phase to the engagement phase and vice versa.

The hydraulic circuit 201 may be in hydraulic communication with the lubrication valve 222 via a pilot line 224. The pilot line 224 may branch off from the clutch delivery line 218, at junction 209. In this way, the pressurized hydraulic fluid provided by clutch control valve 208, in addition to being routed to the clutch 204, is provided to lubrication valve 222 to adjust a position thereof. More specifically, in some examples, the lubrication valve 222 may be biased (e.g., by a spring) into a choked position, realizing a limited flow state where the lubrication valve is substantially or nearly closed. Further, upon application of hydraulic pressure through pilot line 224 (e.g., when the control valve permits a pressurized flow of hydraulic fluid through clutch delivery line 218 to actuate the clutch 204), the lubrication valve may be shifted into an open position, allowing a flow of hydraulic fluid through the lubrication valve into a lubrication line 226. Thus, the lubrication valve 222 may not be directly electronically controlled, but instead be passively controlled using the pressure of the hydraulic fluid provided to the clutch 204 via the control valve 208. In this way, by using a combined control scheme to route oil both for actuation and lubrication of the clutches, several complexities and costs associated with the design and control of the hydraulic system 200 may be reduced.

In some examples, a pressure gauge 223 may be provided in pilot line 224 to measure a hydraulic pressure being applied to the lubrication valve 222 to control a position thereof. In some cases, the lubrication valve may be designed as an on/off type valve. However, in other cases, the lubrication valve may be of the continuously adjusting type, transitioning between multiple opened and closed states. In any case, it will be understood that a clutch actuation pressure within the clutch line 218 affects a state of the lubrication valve 222, selectively permitting or restricting the flow of lubricant to the clutches. Consequently, it will be understood that the clutch actuation pressure (provided to the lubrication valve 222) may be adjusted in accordance with a desired state of the lubrication valve 222 (e.g., the open flow state or the limited flow state) for adjusting the flow of hydraulic fluid through the lubrication valve.

In order to provide hydraulic fluid to the lubrication valve 222 for lubricating the clutches 204, 206, the hydraulic circuit 202 may further include a pump 232 in fluidic communication with the lubrication valve via a lubrication conduit 234. In some examples, the pump 232 may receive hydraulic fluid (e.g. oil) from a reservoir, which may be the reservoir 221. In this way, by providing a common reservoir and hydraulic fluid to be sent to the control valve 208 and the lubrication valve 222 via the pumps 220, 232, respectively, the hydraulic system 200 may be realized in a compact package with reduced size and complexity in a transmission. However, in other examples, the pump 232 may receive hydraulic fluid from a separate reservoir. Further, in some examples, the hydraulic fluid delivered for lubricating clutches 204, 206 may be returned to a reservoir for subsequent use in the hydraulic system 200.

When the lubrication valve 222 is in an open state (e.g., in anticipation of and/or during a gear shift event), hydraulic fluid may be routed from the pump 232 to the lubrication valve 222 and into the lubrication line 226. The lubrication line 226 may then direct the hydraulic fluid to the clutches 204, 206 via lubrication conduits 228, 230 for lubrication thereof, respectively. Hydraulic fluid may flow freely in this manner when the lubrication valve 222 is in the open flow state, under certain operating conditions. However, in other operating conditions, when the lubrication valve 222 is in the limited (e.g., choked) flow state, flow through the lubrication valve and thus the lubrication line 226 is restricted. Specific control strategies for transitioning the lubrication valve 222 between the open and limited flow states under certain conditions will be expanded upon herein, particularly with regard to FIGS. 6-7B.

Another example of a hydraulic system 300 including a lubrication valve 310 is depicted in FIG. 3, incorporated in a portion of a transmission. The hydraulic system 300 may be included in or similar to the hydraulic systems 126, 200 depicted in FIGS. 1 and 2, respectively. Specifically, the lubrication valve 310 may be similar to the lubrication valve 222 depicted in FIG. 2, and may thus be adjusted between an open and limited flow (e.g., choked flow) state using clutch actuation pressure as dictated by a clutch control valve.

The hydraulic system 300 may be disposed within in a rotating shaft 302 (e.g., driving shaft) having a rotational axis 303. Therefore, the shaft 302 may drive rotation of sets of discs in the clutch units 306, 308. Specifically, in one example, the rotating shaft 302 may be selectively rotationally coupled to a driven shaft 304 via clutch units 306, 308. The driven shaft may be rotationally coupled to gears that deliver power to the transmission's output. Each of the clutch units 306, 308 may be multi-disc wet clutches having clutch packs 307, 309, respectively, and other components configured to operate in the manner previously described with regard to FIG. 2.

In some cases, roller bearings 314, 316 (e.g., spherical and/or cylindrical roller bearings) may be included on the rotating shaft 302 for supporting the shaft 302 in the transmission in relation to other transmission components.

Additionally, multiple bearings 318 (e.g., spherical ball bearings) may be included between the rotating shaft 302 and the driven shaft 304. These bearings permit the driving shaft 302 and the driven shaft 304 to rotate independently when the clutch unit 306 is disengaged.

The rotating shaft 302 may include a lubrication line 320, for delivering lubricant to the clutch packs 307, 309 in the clutch units 306, 308, respectively and bearings 318 via lubricant delivery lines 322. The lubrication line 320 may receive hydraulic fluid from a lubricant conduit 323 via the lubrication valve 310. Further, in some examples, the lubricant conduit 323 may receive hydraulic fluid from an inlet 321. In some cases, the inlet 321 may be located at an axial end of the rotating shaft, although other configurations have been envisioned, such as a radially extending inlet channel opening to an outer diameter of the rotating shaft. The inlet 321 may be in fluidic communication with a pump and reservoir, in any manner previously described herein.

The lubrication line 320 and the lubricant conduit 323 may share a common longitudinal axis 325, which may be offset from and parallel to the central rotational axis 303 of the rotating shaft 302. Further, in some examples, the delivery lines 322 may be oriented normal to the common axis 325, radially extending from the lubrication line 320 to an outer surface of the rotating shaft 302. The delivery lines 322 may be radially aligned and are shown opening into sections of the transmission between two of the bearings 318, in one example. In this way, the lubricant may be efficiently routed through the transmission. However, other line contours have been contemplated. For instance, the delivery lines 322 may extend from the lubrication line 320 to the outer surface of the rotating shaft at a different angle (e.g., 45 degrees, 30 degrees, 15 degrees, etc.).

The rotating shaft may further include a clutch actuation line 330 for delivering hydraulic fluid to an actuation chamber of the clutch unit 308. The actuation line may receive hydraulic fluid at an inlet 331. Further, the inlet 331 may be in fluidic communication with a control valve which receives pressurized hydraulic fluid from a reservoir via a pump, in any manner previously described herein. In some cases, the inlet 331 may be located on an outer diameter of the rotating shaft 302 proximate one end. However, other configurations have been contemplated, such as an inlet opening at an axial end of the shaft (e.g., similar to the inlet 321). Further, in the illustrated embodiment, the inlet 321 of the lubricant conduit 323 and the inlet 331 of the clutch actuation line 330 are positioned at or near opposing ends of the shaft 302. However, in other examples, the inlets may have different relative arrangements, such as, for instance, where both of the inlets 321, 331 may be positioned at or near the same end of the rotating shaft. Further, the clutch actuation line 330 may have a longitudinal axis 335, which, similar to the axis 325 of the lubrication lines, may be parallel to and offset from the central rotational axis 303 of the rotating shaft 302.

The lubrication valve 310 includes a passive adjustment device 329 that is designed to switch the state of the valve using the pressure of the fluid in the clutch actuation line 330. To carry out this device functionality, the passive adjustment device 329 may include a control conduit 312 defining a chamber of the lubrication valve 310 and a spring 315 that may be coupled to a piston in the valve. The control conduit 312 may extend (e.g., radially extend) from the clutch actuation line 330. As such, a first end (e.g., upper end) of the control conduit 312 is in hydraulic communication with the clutch actuation line 330, and a second end (e.g., lower end) of the control conduit 312 is in hydraulic communication with the passive adjustment device 329.

Detailed views of the lubrication valve 310 in a limited flow state (e.g., choked flow state) and an open flow state are shown in FIGS. 4 and 5, respectively. It should be noted that the lubrication valve is also shown in the limited flow state in FIG. 3. The lubrication valve 310 may be a spool-type valve, such as a piston spool valve, in one example. The piston of the valve 310 may be slidably movable within the control conduit 312 along an axis thereof to control a hydraulic flow from the lubrication line 321 to the lubrication line 320. In some cases, the piston of the valve 310 may be biased by a spring 315, so as to be positioned in the limited flow state 400 in FIGS. 3-4, whereby a flow of oil into the lubrication line 320 is restricted. Further the piston of the valve 310 may include a seal proximate a central portion thereof, so as to seal off the conduit 312 to maintain a separate hydraulic flow in the clutch actuation line 330 independent from a hydraulic flow between the lubricant conduit 323 and line 320.

In the hydraulic system configuration depicted in FIG. 4, the hydraulic pressure in the clutch line 330 does not induce actuation of the passive adjustment device 329. As such, the spring 315 in the passive adjustment device 329 is decompressed and the device is restricting flow through the valve 310 and between the lubricant conduit 323 and to the lubrication line 320. However, alternate arrangements of the passive adjustment device have been contemplated.

FIG. 5 depicts the lubrication valve 310 in the open flow state 500. To elaborate, in the open flow state, the hydraulic pressure in the clutch actuation line is greater than the threshold pressure that moves the clutch into the open flow state. In order to provide a hydraulic pressure to the clutch actuation line 330 and therefor the control conduit 312, the clutch control valve is operated (e.g., electronically operated) to supply a pressurized flow of hydraulic fluid through the inlet 331, shown in FIG. 3, into the clutch actuation line 330. The clutch actuation line 330 also routes the pressurized flow to the actuation chamber of the clutch unit 308 via an actuation delivery line 332, shown in FIG. 3. The line 332 may be routed through the driving shaft 302 to provide fluid to the clutch's control piston.

Returning to FIG. 5, the hydraulic pressure in the clutch actuation line is communicated to the control conduit 312 to exert a force on the piston of the lubrication valve 310. When the hydraulic pressure surpasses a threshold pressure (e.g., overcoming the biasing force of the spring 315 in the passive adjustment device 329), the piston of the lubrication valve 310 will be moved (e.g., downwardly) into an open position where the flow 502 of hydraulic fluid from the lubricant conduit 323 into the lubrication line 320. Thus, the hydraulic fluid in lubrication line 320 may be delivered to clutch components via lubrication delivery lines 322, particularly in anticipation of or during actuation of the clutch the clutch 308 is being actuated and lubrication demands of the system may be higher.

Oil may be provided at a high (e.g., maximum) flow rate to lubricate the clutches 306, 308 when one of the clutch is engaged or shift event is anticipated. However, supplying a high flow rate of oil to a disengaged clutch decreases the efficiency of the transmission. Thus, it may be desired to limit the flow of hydraulic fluid in the lubrication line 320 when the clutch 308 is disengaged and a shifting event is not anticipated. The spring-biased lubrication valve 310 may therefore be placed in the limited flow state 400, as depicted in FIG. 4, to restrict the flow of hydraulic fluid in the lubrication line 320 under certain operating conditions (e.g., when a gear shift event is not anticipated), thereby reducing drag torque experienced at the clutch and increase transmission efficiency.

During transmission operation, the rotating shaft 302 may be rotated while the hydraulic pressure supplied to the clutch actuation line 330 (and the resulting adjustment of the lubrication valve 310) is adjusted. In some system configurations, centrifugal forces result from the rotation, due to misalignment of a center of gravity of the lubrication valve 310 and the central rotational axis 303 of the shaft 302, which may have some effect on the adjustability of the lubrication valve. However, the spring 315 may be constructed with a spring constant that allows the spring to exert a biasing force on the piston in the valve that is greater than the expected centrifugal forces which may urge the valve's piston into the open state from the limited flow state. In this way, the lubrication valve is inhibited from inadvertently opening due to the centrifugal forces generated via shaft rotation. In this way, the simple design of the lubrication valve may provide a reliable, inexpensive solution for passively controlling the flow of lubrication to clutch components during certain operating conditions which takes into account drive shaft rotation.

In some examples, with reference to FIGS. 3-5, the clutch 308 may be a first forward drive clutch, such that actuating the clutch 308 to the engaged position places the transmission in a first forward drive gear. Further, the clutch 306 may be a reverse drive clutch or a second forward drive clutch, such that engagement of the clutch 306 may place the transmission in a reverse drive gear or a second forward drive gear, respectively. When the transmission is operated to shift into the first forward drive gear, the hydraulic pressure in the clutch actuation line may be increased (e.g., via actuation of a control valve) so as to actuate the clutch unit 308 and correspondingly adjust the lubrication valve 310 from the choked position 400 to the open position 500 to allow a higher flow of oil to lubricate each of the clutches 306, 308 and associated bearings. Thus, control techniques for the hydraulic system may be dependent on an operating gear ratio of the transmission, as well as other operating conditions, as will be described herein with reference to FIGS. 6-7B.

A control strategy or method 600 for determining a desired lubrication valve state and operating a clutch control valve to achieve the desired state is shown in FIG. 6. The method 600 may be carried out by any of the transmission and hydraulic systems system in FIGS. 1-5 and/or 8 or combinations of the transmissions and hydraulic systems depicted therein. However, in other examples, the method 600 may be implemented in other suitable transmissions and hydraulic systems. Instructions for carrying out the method 600 and other control strategies or routines described herein may be stored on a memory of a controller and executed by a processor of the controller in conjunction with signals received from sensors at the controller. The controller may employ actuators in different hydraulic system components to implement the method steps described below.

At 602, the method determines a transmission ratio (e.g., the mechanical transmission ratio representing the input to output speed ratio of the transmission). In one example, determining the transmission ratio may include measuring shaft speeds (e.g., the speed of the transmission's input and output shaft, using shaft speed sensors, for instance) and subsequently calculating the transmission's ratio from the sensor inputs. However, in other examples, the transmission ratio may be modelled. In one example, the determined gear ratio may indicate that the transmission is in a first forward drive gear (e.g., a first positive, non-zero ratio), a second forward drive gear (e.g., a second positive, non-zero ratio, greater than the first ratio), or a first reverse drive gear (e.g., a negative, non-zero ratio). Further, in some cases, in each of the three gear ratios the clutch associated with the operating gear ratio is engaged while the other clutches are disengaged.

At 604, the method judges if the commanded state of the lubrication valve should be an open flow state or a limited (e.g., choked) flow state based on the transmission ratio and/or other operating conditions. For instance, when the transmission ratio approaches a gear ratio shift point (e.g., transitioning into the first forward drive gear from the second forward drive gear or the first reverse drive gear), it may be desired to provide a greater flow of hydraulic fluid through the lubrication valve to lubricate clutch components to enable a smooth transition into the relevant gear. Under these conditions it may be determined that the lubrication valve should be transitioned into the open flow state. Conversely, when the transmission ratio is far enough away from a gear shift point (e.g., transitioning into the first forward drive gear is not anticipated), a desire for greater efficiency may be desired, since the clutch is not engaged (or near actuation to cause engagement thereof). Under these conditions, it may be determined that the lubrication valve should be transitioned into the limited flow state. In some cases, determining the desired valve state may further take into account inputs from other sensors in the hydraulic system and/or vehicle, such as an oil temperature measured by an oil temperature sensor.

Therefore, when it is determined that the transmission ratio is approaching (or within) a range associated with the first forward drive gear, the method transitions the lubrication valve into the open flow state, so as to provide a high pressure of oil for lubrication of clutch components, in order to enhance shift quality during the shift event. Conversely, when the gear ratio is determined to be far enough away from the first forward drive gear range, lubrication demands in the hydraulic system may lower, the method transitions the lubrication valve into the limited flow state. As such, in the limited flow state, the hydraulic flow to the clutch discs is restricted, thereby reducing drag torque and increasing transmission efficiency.

Next, at 606, the method determines a speed of the rotating shaft in which the lubricant valve resides and a desired lubricant pressure. In other examples, however, the step 606 may determine other operating conditions, as measured by various sensors.

At 608, the method calculates a desired clutch pressure, which may be a hydraulic pressure to be supplied via a clutch actuation line to engage or disengage a clutch. In one example, the desired clutch pressure may be zero or near-zero, when the clutch is to be disengaged (e.g., when the transmission ratio is outside of the first forward drive gear range), or a high pressure value, when the clutch is to be fully engaged (e.g., in the first forward drive gear). In some examples, the desired clutch pressure may be a value between the near-zero value and the high pressure value, such as during a prefilling step of a clutch.

At 610, the method adjusts the clutch control valve to achieve the desired clutch actuation pressure to transition or maintain the lubrication valve in the desired state. As previously discussed, the desired lubrication valve state may be realized by adjusting the hydraulic pressure in the clutch actuation line via control valve adjustment, and detailed discussion will be omitted for brevity.

By accounting for the clutch lubricant demands using the transmission ratio, the method provides a simple and effective way to supply clutch lubrication when the clutch is engaged and decreases the clutch lubrication when the clutch is disengaged to decrease drag torque and increase transmission efficiency.

FIG. 7A depicts a graphical representation of a prophetic use-case control diagram 700 with transmission gear ratios, and FIG. 7B depicts a prophetic use-case timing diagram 750. In some cases, control diagram 700 and/or timing diagram 750 may be implemented in accordance with the method 600 depicted in FIG. 6, and may thus be implemented in the hydraulic systems described above, with reference to FIGS. 1-5, or another suitable hydraulic system.

Turning to FIG. 7A, in each chart and plot of the diagram 700, the transmission gear ratio is indicated on the abscissa and increases in the direction of the arrow. Chart 702 graphically represents different transmission operating modes corresponding to the gear ratio, which, in the illustrated example, include a first reverse drive gear 704 (e.g., a negative, non-zero ratio), a first forward drive gear 706 (e.g., a first positive, non-zero ratio), and a second forward drive gear 708 (e.g., a second positive, non-zero ratio, greater than the first ratio). The ordinate of plot 710 indicates a lubrication valve state (e.g., open or choked), and the ordinate for plot 712 indicates a hydraulic pressure applied to the first forward drive clutch's actuator (e.g., control piston).

When the transmission is operating in the reverse drive gear 704 or the second forward drive gear 708 far enough away from a shift point, the clutch pressure supplied to the clutch associated with the first forward drive gear 706 is held at a lower value (e.g., at or near zero), such that the lubrication valve remains in a choked state.

When the gear ratio approaches a gear shift point between the reverse gear and the first gear, the clutch pressure is increased above a threshold pressure 713 at GR1. The threshold pressure 713 is the clutch line pressure at which the lubrication valve transitions from the choked flow state to the open flow state or vice versa. However, the clutch pressure may be below a pressure that triggers clutch engagement (e.g., full clutch engagement). The clutch pressure may be increase above the threshold pressure when a variance between the current gear ratio and a shift point ratio (GR0), representing the shift point between the reverse gear and the first forward drive gear, is less than a threshold ratio variance:GR0-GR1, in the illustrated use-case. As depicted, the shift point ratio (GR0) is zero.

Next the clutch pressure is further increased to cause full engagement of the first forward drive clutch and allow the transmission to shift from the reverse drive gear 704 into the first forward drive gear 706. Therefore, at GR0 the lubrication valve transitions to the open state.

As the gear ratio increases, the transmission shifts from the first forward drive gear 706 to the second forward drive gear 708, at GR2. However, at GR2, the clutch pressure is reduced but remains above the threshold pressure 713, so that the lubrication valve remains in the open state. In this way, the chance of clutch degradation caused by insufficient lubrication is reduced. However, when the difference between the operating gear ratio and the shift point ratio (GR2), representing the shift point between the first forward gear and the second forward gear, surpasses the threshold ratio variance (GR3-GR2 in the illustrated use-case), the clutch pressure is further reduced to a pressure below the threshold pressure 713, at GR3. As a result, the lubrication valve transitions from the open state to the choked state while the transmission remains in the second forward drive gear. Further, it will be understood that the same sequence of clutch pressure adjustment may occur when the transmission shifts from the second forward drive gear 708 to the first forward drive gear 706, and so on. In this way, controlling the clutch pressure to effect an open state of the lubrication valve may allow the hydraulic system to efficiently lubricate clutch components when there is a high demand for lubricant (e.g., before and/or after a gear shift event, and during clutch actuation), while avoiding the use of an electronic actuator directly controlling the lubrication valve.

Turning to FIG. 7B, in each plot of the timing diagram 750, time is indicated on the abscissa and increases in the direction of the arrow. The ordinate of plot 752 indicates a clutch state (engaged or disengaged), of the first forward drive gear clutch. The ordinate of plot 754 indicates a hydraulic pressure (e.g., supplied to the clutch via a control valve in a hydraulic system of the transmission), and the ordinate of plot 756 indicates a lubrication valve state (open or choked).

From t0 to t2, the first gear clutch is disengaged. However, at t1, when the transmission approaches a gear shift event (into the first gear from the reverse gear), the hydraulic pressure is increased above a threshold pressure 755, and the lubrication valve is transitioned from the choked flow state to the open flow state. Consequently, hydraulic fluid may flow through the lubrication valve to lubricate the first gear clutch at a time before the clutch is fully engaged, allowing for a smooth transition into the first gear. In this way, the system may provide a greater flow of lubricant when a demand for lubrication at the clutch is higher (e.g., before and during clutch actuation). While efficiency losses may arise when the lubrication valve is in the open flow state and the clutch is disengaged, these losses may be decreased by employing the open flow state in this manner. As such, the duration of the open flow state may be constrained to specific times when clutch lubrication is desired for shifting operations and during clutch engagement.

At t2, the hydraulic pressure is further increased to a higher pressure that causes full engagement of the first gear clutch, and the lubrication valve remains in the open flow state. Further, from t2 to t3, the hydraulic pressure remains at the higher value, the first gear clutch remains engaged, and the lubrication valve remains in the open state.

At t3, the hydraulic pressure is decreased and the first gear clutch is disengaged. From t3 to t4, the hydraulic pressure is sustained above the threshold pressure 755 while the transmission remains in a second gear, after the transmission shift event at t3, and the lubrication valve remains in the open flow state.

At t4, the hydraulic pressure is further reduced to a value lower than the threshold pressure 755. Consequently, the lubrication valve is transitioned from the open flow state to the choked flow state, and the first gear clutch remains disengaged. In this way, by maintaining the lubrication valve in the open flow state for some time after a shift event (from t3 to t4), the system can avoid an abrupt drop in lubrication immediately upon shifting out of the first gear, which may decrease the likelihood of clutch component degradation and increase system longevity.

FIG. 8 shows a schematic depiction of a transmission 800 (e.g., an HVT) in a vehicle 802. The vehicle 802 and the transmission 800 are examples of the vehicle 102 and transmission 110 depicted in FIG. 1. Therefore, the transmission 800 may include structural and/or functional features of the transmission 110, or vice versa.

The transmission 800 may function as an IVT where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

The transmission 800 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of an additional clutch which may increase system complexity.

The transmission 800 may include or receive power from a motive power source 804. The power source 804 may include an internal combustion engine, electric motor (e.g., electric motor-generator), combinations thereof, and the like.

A torsional damper coupling 806 may be further provided in the transmission. Gears 808, 810, such as bevel gears, may be used to rotationally couple the power source 804 to an input shaft 812. As described herein, a gear may be a mechanical component which rotates and includes teeth that are profiled to mesh with teeth in one or more corresponding gears to form a mechanical connection that allows rotational energy transfer therethrough.

A mechanical PTO 814 may be coupled to the input shaft 812. The mechanical PTO 814 may drive an auxiliary system such as a pump (e.g., a hydraulic pump, a pneumatic pump, and the like), a winch, a boom, a bed raising assembly, etc. To accomplish the power transfer to auxiliary components, the PTO may include an interface, shaft(s), housing, and the like. However, in other examples, the PTO and/or the disconnect clutch may be omitted from the transmission. A gear 816 may be coupled to the input shaft 812. A mechanical assembly 818 is further included in the transmission 800. The mechanical assembly 818 may include the shaft 812 and/or the gear 816 as well as shaft 867, described in greater detail herein. Further, the transmission may include a shaft 820 and a gear 822 rotationally coupled to the gear 816 on the input shaft 812. Dashed line 824 and the other dashes lines depicted in FIG. 8 indicate a mechanical connection between components which facilitates rotational energy transfer therebetween.

A gear 826 meshing with gear 822 may be rotationally attached to a charging pump 828. The charging pump 828 may be designed to deliver pressurized fluid to hydraulic components in the transmission such as a hydraulic motor 834 (e.g., hydrostatic motor), a hydraulic pump 836 (e.g., hydrostatic pump), and the like. The fluid pressurized by the charging pump may additionally be used for clutch actuation and/or transmission lubrication. The charging pump may include a piston, a rotor, a housing, chamber(s), and the like to allow the pump to move fluid. The mechanical assembly 818 is rotationally coupled in parallel to a hydrostatic assembly 830. Further, the hydrostatic assembly 830 may have a U-shape design where the mechanical interface shafts 831, 833 for a hydraulic pump 836 (e.g., variable displacement pump) and a hydraulic motor 834 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 830 may be arranged on an opposite side of the transmission as the charging pump 828 and/or axially offset from clutches 870, 872. Arranging the hydrostatic assembly in this manner permits the width and length of the transmission to be reduced and allows the installation of the transmission in the vehicle to be simplified.

The coupling of the hydrostatic assembly to the mechanical assembly enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

The mechanical assembly 818 may include multiple mechanical paths that are coupled in parallel to the hydrostatic assembly. To elaborate, the shaft 867 may serve as a junction for a first mechanical path (e.g., branch) 819 and a second mechanical path (e.g., branch) 821. The first mechanical path 819 may provide rotational energy transfer capabilities from an interface of the hydrostatic assembly 830 to a ring gear 858 of a first planetary gear set 848, during certain operating conditions. Additionally, the second mechanical path 821 may provide rotational energy transfer capabilities from the interface of the hydrostatic assembly 830 to a carrier 860 of a second planetary gear set 850.

The hydrostatic assembly 830 includes the hydraulic motor 834 and the hydraulic pump 836. Further, the hydraulic pump 836 may include a first mechanical interface 838 and a second mechanical interface 840. The first mechanical interface 838 may be rotationally coupled to a mechanical bushing 832 and the second mechanical interface 840 may be rotationally coupled to another mechanical PTO 842. Again, the mechanical PTO may be used to drive an auxiliary vehicle system such as an air compressor, a mechanical arm or boom, an auger, etc. In this way, the transmission may be adapted for a variety of end-use operating environments. Providing multiple PTOs, in the arrangement depicted in FIG. 8, enables the transmission system to meet end-use design goals in a variety of different types of vehicles, if wanted. As such, the system's applicability is expanded and the customer appeal of the transmission is increased. However, in other examples, the PTOs 814 and/or 842 may be omitted from the transmission.

The hydraulic pump 836 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 834 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 844, 846 are attached to hydraulic interfaces in each of the motor and pump to enable the hydrostatic assembly to provide additive and power circulation functionality with regard to the mechanical branches arranged in parallel with the hydrostatic assembly 830. For example, in an additive power mode, power from both the hydrostatic and mechanical assemblies is combined at one of the planetary gear sets and delivered to the transmission output. In a recirculating power mode, power is recirculated through the hydrostatic assembly. Therefore, the hydraulic pump 836 and the motor 834 may be operated to flow power to the sun gears of either planetary assembly from the hydraulic motor. Conversely, the pump and the motor may be operated to flow power back to the gear set and the mechanical branches.

The transmission 800 further includes the first planetary gear set 848 and the second planetary gear set 850. The first planetary gear set 848 may include a carrier 852 on which planet gears 854 rotate. The planet gears 854 may mesh with a sun gear 856 and the ring gear 858. Likewise, the second planetary gear set 850 may include the carrier 860, planet gears 862, a sun gear 864, and a ring gear 866. Therefore, the second planetary gear set 850 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motion.

The carrier 860 of the second planetary gear set 850 may be rotationally coupled to the ring gear 858 of the first planetary gear set 848. Further, the carrier 860 of the second planetary gear set 850 may be rotationally coupled to a shaft 867. The shaft 867 may extend through a central opening in an extension 886, described in greater detail herein. This rotational attachment scheme may be conceptually described as a formation of mechanical branches attached in parallel to the hydrostatic assembly 830.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 856, 864 of the first and second planetary gear sets 848, 850 may be rotationally coupled (e.g., directly attached) to one another. Attaching the sun gears in this manner may enable the transmission to achieve a desired gear ratio, compactness, and efficiency.

The hydraulic motor 834 may be rotationally coupled to the sun gear 856 via a mechanical bushing 868, for instance. The transmission 800 further includes a reverse clutch 870, a first forward drive clutch 872, and a second forward drive clutch 874. The clutches 870, 872, 874 may be positioned near to an output shaft 871 and downstream of the planetary assembly. Arranging the clutches in this location allows a targeted compromise between clutch size and clutch speed. For instance, relatively high clutch speeds may generate higher power losses. Further, the reverse clutch 870 and the first forward drive clutch 872 may be arranged adjacent and coaxial to one another. In one particular example, the clutches may have a similar design to reduce manufacturing complexity. This twin clutch arrangement therefore permits manufacturing costs to be reduced and increases the transmission's compactness.

The clutches 870, 872, 874 may be friction clutches that each includes two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. The carrier 852 may include an extension 875 with a gear 876 that meshes with a gear 877. The gear 877, in the illustrated example, is rotationally coupled to the reverse clutch 870 and the first forward clutch 872. The reverse clutch 870 and the first forward clutch 872 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 879 may reside on an output shaft 880 of the reverse clutch 870. Likewise, a gear 881 may reside on an output shaft 882 of the first forward clutch 872. Both gears 879, 881 may be rotationally attached to the system output shaft 871 via gears 883, 884 respectively. In this way, both the reverse clutch and the first forward clutch deliver power to the transmission's output, during different operating conditions.

The system output shaft 871 may include one or more interfaces 885 (e.g., yokes, gears, chains, combinations thereof, etc.). The output shaft is specifically illustrated with two outputs. However, the transmission may include an alternate numbers of outputs. The gear 879 is rotationally coupled to the output shaft via meshing with gear 883. Arrows 891 depict the flow of power from the transmission system to drive axles 892 and/or other suitable downstream vehicle components or vice versa. A driveline with a shaft, joints, etc. may be used to carry out the power transfer between the transmission and the axles. It will be understood that the drive axles may include drive wheels. FIG. 8 further depicts rotational speed sensors 899 that measure the speed of a gear and shaft on which the gear resides.

The ring gear 866 of the second planetary gear set 850 may include the extension 886 with a gear 887 position thereon. The gear 887 may be rotationally attached to a gear 888 in the second forward clutch 874, as indicated via a dashed line. The gear 888 may be coupled to a first set of plates in the clutch 874. A second set of plates in the clutch may be attached to an output shaft 889 and a gear 890. The gear 890 may be rotationally coupled to the gear 883, as indicated by a dashed line. Due to the aforementioned arrangement of the clutches and the planetary gear sets, the transmission 800 achieves a higher efficiency and enhanced drivability, comfort, and productivity than previous hydro-mechanical transmissions.

The technical effect of the control methods for the transmission hydraulic systems described herein is to efficiently and passively control a lubrication valve, based on a gear ratio in a transmission and an efficiency standpoint, and operating a control valve accordingly in order to provide lubricant to a wet friction clutch when demanded to increase clutch longevity but decrease the lubricant flow to the clutch during clutch disengagement to decrease drag torque and correspondingly increase transmission efficiency.

FIGS. 2-5 are drawn approximately to scale. However, other relative component dimensions may be used, in other embodiments.

FIGS. 1-5 and 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a hydraulic system in a transmission is provided that comprises a lubrication valve positioned in a lubricant line in fluidic communication with a multi-disc wet clutch; a clutch line in fluidic communication with a clutch actuator of the multi-disc wet clutch and a passive adjustment device of the lubrication valve; and a clutch control valve coupled to the clutch line; wherein the passive adjustment device transitions the lubrication valve between a limited flow state and an open flow state based on a pressure of a hydraulic fluid in the clutch line.

In another aspect, a transmission is provided that comprises a hydraulic system including a lubrication valve positioned in a lubrication line in fluidic communication with a plurality of discs in a multi-disc wet clutch; a clutch line fluidic communication with an actuation piston of the multi-disc wet clutch; a clutch control valve designed to adjust a pressure of a hydraulic fluid in the clutch line; wherein a passive adjustment device of the lubrication valve configured to transition the lubrication valve between a limited flow state and an open flow state based on a pressure of the hydraulic fluid in the clutch line; and a controller including instructions that, when executed after the transmission is shifted into a second gear from a first gear, cause the controller to adjust the pressure in the clutch line to transition the lubrication valve from an open flow state to a choked flow state via operation of the clutch control valve to decrease a pressure of the oil in the clutch line below a threshold pressure.

In yet another aspect, a method for operating a hydraulic system in a transmission is provided that comprises adjusting a pressure of a hydraulic fluid in a clutch line to switch a lubrication valve between an open flow state and a limited flow state; wherein the lubrication valve is positioned in a valve conduit in fluidic communication with a plurality of discs in a multi-disc hydraulic clutch; and wherein the clutch line is in fluidic communication with a passive adjustment device of the lubrication valve and a piston actuator of the multi-disc hydraulic clutch. In one example, adjusting the pressure in the clutch line may include maintaining the pressure of the hydraulic fluid in the clutch line above a threshold pressure that adjusts the passive adjustment device to transition between the open flow state and the limited flow state in the lubrication valve based on an operating gear ratio of the transmission. In another example, adjusting the pressure in the clutch line may include transitioning the lubrication valve from the open flow state to the limited flow state via decreasing the pressure of the hydraulic fluid in the clutch line below the threshold pressure, in response to a difference between a current transmission ratio and a shift event transmission ratio exceeding a threshold value, wherein the shift event includes switching the transmission from a first gear to a second gear. In yet another example, the method may include, while the pressure of the hydraulic fluid in the clutch line is sustained above the threshold pressure, holding the transmission in the first gear via maintaining engagement of the multi-disc hydraulic clutch. In another example, transitioning the lubrication valve from the open flow state to the limited flow state may include discretely transitioning the lubrication valve from the open flow state to the limited flow state. In another example, the method may include rotating a shaft in which the lubrication valve is positioned while the pressure of the hydraulic fluid in the clutch line is adjusted.

In any of the aspects or combinations of the aspects, the hydraulic system may further comprise a controller including instructions that when executed, during operation of the transmission, cause the controller to: determine a desired lubrication valve state based on a transmission ratio; and adjust the pressure in the clutch line via clutch control valve actuation to reconfigure the passive adjustment device to place the lubrication valve in the limited flow state or the open flow state based on a transmission shift event.

In any of the aspects or combinations of the aspects, adjusting the pressure in the clutch line via clutch control valve actuation may include: decreasing the pressure in the clutch line below a threshold pressure that transitions the lubrication valve from the open flow state to the limited flow state, in response to a difference between a current transmission ratio and a shift point transmission ratio exceeding a threshold value.

In any of the aspects or combinations of the aspects, adjusting the pressure in the clutch line via clutch control valve actuation may include: sustaining the pressure in the clutch line above a threshold pressure that transitions the lubrication valve from the open flow state to the limited flow state, while the difference between the current transmission ratio and the shift point transmission ratio remains below a threshold value.

In any of the aspects or combinations of the aspects, the lubrication valve may continuously transition between the limited flow state and the open flow state.

In any of the aspects or combinations of the aspects, the lubrication valve may discretely transition between the limited flow state and the open flow state.

In any of the aspects or combinations of the aspects, the lubrication valve, the lubrication line, and the clutch line may be included in a rotating shaft.

In any of the aspects or combinations of the aspects, the passive adjustment device may not be directly electronically actuated.

In any of the aspects or combinations of the aspects, the limited flow state may be a choked flow state.

In any of the aspects or combinations of the aspects, the transmission may further comprise instructions that when executed, while the transmission is maintained in the first gear, cause the controller to: sustain the lubrication valve in the open flow state via operation of the clutch control valve to maintain the pressure of the oil in the clutch line above the threshold pressure.

In any of the aspects or combinations of the aspects, the lubrication valve may be transitioned to the choked flow state from the open flow state in response to a duration of the transmission remaining in the second gear after the transmission shift event exceeding a threshold duration.

In any of the aspects or combinations of the aspects, the first gear may be a first forward drive gear and the second gear may be a first reverse drive gear or a second forward drive gear.

In any of the aspects or combinations of the aspects, the transmission may be a hydromechanical variable transmission (HVT).

In another representation, a lubrication system in a hydromechanical transmission is provided that comprises a passive pressure controlled lubricant valve that includes an pressure adjustable actuator that is in fluidic communication with a clutch conduit that extends between a clutch control valve and a clutch control piston; and a controller configured to adjust the clutch control valve to selectively switch the lubricant valve between an open flow and a restricted flow configuration based on a transmission shift event.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. Thus, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "substantially" and "approximately" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system in a transmission, comprising:
   a clutch line in fluidic communication with:
      a clutch actuator of a wet clutch; and
      a passive adjustment device of a lubrication valve that is in fluidic communication with the wet clutch;
   a clutch control valve coupled to the clutch line; and
   a controller including instructions that when executed, in anticipation of a gear shift event, cause the controller to:
      adjust a pressure in the clutch line via adjustment of the clutch control valve to reconfigure the passive adjustment device to place the lubrication valve in an open flow state, the pressure in the clutch line being maintained below a threshold pressure that triggers clutch engagement prior to the gear shift event.

2. The system of claim 1, wherein the controller further includes instructions that when executed, when a difference between an operating gear ratio and a shift point ratio of the transmission surpasses a threshold ratio variance, cause the controller to:
   adjust the pressure in the clutch line via adjustment of the clutch control valve to reconfigure the passive adjustment device to place the lubrication valve in a limited flow state,
   wherein the shift point ratio is a gear ratio of a gear next to a gear in the transmission with the operating gear ratio.

3. The system of claim 1, wherein the controller further includes instructions that when executed, when a difference between an operating gear ratio and a shift point ratio of the transmission remains below a threshold ratio variance, cause the controller to:

maintain, via operation of the clutch control valve, the pressure in the clutch line above a threshold value that transitions the lubrication valve from the open flow state to a limited flow state, wherein the shift point ratio is a gear ratio of a gear next to a gear in the transmission with the operating gear ratio.

4. The system of claim 1, wherein the gear shift event occurs between two forward drive gear ranges.

5. The system of claim 1, wherein the gear shift event occurs between a reverse drive gear range and a forward drive gear range.

6. The system of claim 1, wherein the system has an asymmetric number of forward drive ranges and reverse drive ranges.

7. The system of claim 1, wherein the control valve is in fluidic communication with a pump.

8. The system of claim 1, wherein the transmission is a hydromechanical transmission.

9. A method for operation of a transmission system, comprising:

in response to a difference between an operating gear ratio and a shift point ratio of the transmission system decreasing below a threshold ratio variance, adjusting a pressure in a clutch line via adjustment of a clutch control valve to reconfigure a passive adjustment device to place a lubrication valve in an open flow state, the pressure being below a threshold pressure that triggers clutch engagement, the shift point ratio being a gear ratio of a gear next to an operating gear in the transmission system, the operating gear having the operating gear ratio;

wherein the transmission system comprises:
the clutch line which is in fluidic communication with:
a clutch actuator of a wet clutch; and
the passive adjustment device of the lubrication valve that is in fluidic communication with the wet clutch; and
the clutch control valve which is coupled to the clutch line.

10. The method of claim 9, further comprising:
in response to a difference between the operating gear ratio and the shift point ratio of the transmission surpassing the threshold ratio variance, adjusting the pressure in the clutch line via adjustment of the clutch control valve to reconfigure the passive adjustment device to place the lubrication valve in a limited flow state.

11. The method of claim 9, further comprising:
while the difference between the operating gear ratio and the shift point ratio of the transmission system remains below the threshold ratio variance, maintaining the pressure in the clutch line above a threshold value that transitions the lubrication valve from the open flow state to a limited flow state via operation of the clutch control valve.

12. The method of claim 9, wherein the lubrication valve is not directly electronically controlled.

13. The method of claim 9, wherein the shift point ratio corresponds to a shift event between two drive gear ranges.

14. The method of claim 13, wherein the two drive gear ranges are forward drive gear ranges.

15. A transmission system, comprising:
a clutch line in fluidic communication with:
a clutch actuator of a wet clutch; and
a passive adjustment device of a lubrication valve that is in fluidic communication with the wet clutch;
a clutch control valve coupled to the clutch line; and
a controller including:
instructions that when executed, during a first operating condition prior to wet clutch engagement, cause the controller to:
adjust a pressure in the clutch line via the clutch control valve actuation to reconfigure the passive adjustment device to place the lubrication valve in an open flow state based on a shift point ratio, the pressure being below a threshold that triggers wet clutch engagement, the shift point ratio being a gear ratio of a gear next to a currently operating gear; and
instructions that when executed, during a second operating condition, cause the controller to:
adjust the pressure in the clutch line via the clutch control valve actuation to reconfigure the passive adjustment device to place the lubrication valve in limited flow state based on the shift point ratio.

16. The transmission system of claim 15, wherein the first operating condition is a condition where a difference between an operating gear ratio and the shift point ratio of the transmission decreases below a threshold ratio variance.

17. The transmission system of claim 16, wherein the second operating condition is a condition where a difference between the operating gear ratio and the shift point ratio of the transmission surpasses the threshold ratio variance.

18. The transmission system of claim 16, wherein the controller further includes instructions that when executed, when a difference between the operating gear ratio and the shift point ratio of the transmission remains below the threshold ratio variance, cause the controller to:
maintain the pressure in the clutch line above a threshold value that transitions the lubrication valve from the open flow state to the limited flow state via operation of the clutch control valve.

19. The transmission system of claim 15, wherein the limited flow state is a choked flow state.

20. The transmission system of claim 15, wherein the transmission system is a hydromechanical variable transmission (HVT) system.

* * * * *